US 8,653,958 B2

United States Patent
Tanabe et al.

(10) Patent No.: US 8,653,958 B2
(45) Date of Patent: Feb. 18, 2014

(54) COLLISION DETECTION APPARATUS AND METHOD FOR SAME

(75) Inventors: Takatoshi Tanabe, Ichinomiya (JP); Tomoya Shimizu, Kariya (JP)

(73) Assignee: Denso Corporation, Kariya (JP)

( * ) Notice: Subject to any disclaimer, the term of this patent is extended or adjusted under 35 U.S.C. 154(b) by 1004 days.

(21) Appl. No.: 12/220,077

(22) Filed: Jul. 21, 2008

(65) Prior Publication Data
US 2009/0027181 A1    Jan. 29, 2009

(30) Foreign Application Priority Data

Jul. 23, 2007    (JP) .................................. 2007-190676

(51) Int. Cl.
B60Q 1/00    (2006.01)

(52) U.S. Cl.
USPC .......... 340/436; 340/425.5; 340/901; 293/132

(58) Field of Classification Search
USPC ......................... 340/436, 425.5, 901; 293/132
See application file for complete search history.

(56) References Cited

U.S. PATENT DOCUMENTS

| | | | |
|---|---|---|---|
| 5,711,562 A | 1/1998 | Terada et al. | |
| 6,323,443 B1 * | 11/2001 | Aoki et al. | 177/144 |
| 6,561,301 B1 | 5/2003 | Hattori et al. | |
| 6,744,354 B2 * | 6/2004 | Stephan et al. | 340/436 |
| 7,025,163 B2 * | 4/2006 | Fuertsch et al. | 180/274 |
| 7,201,412 B2 | 4/2007 | Kashiwagi et al. | |
| 7,331,415 B2 * | 2/2008 | Hawes et al. | 180/274 |
| 7,525,416 B2 * | 4/2009 | Mader | 340/436 |
| 7,677,080 B2 * | 3/2010 | Lichtenberg et al. | 73/12.09 |
| 2002/0033755 A1 * | 3/2002 | Ishizaki et al. | 340/436 |
| 2005/0116817 A1 * | 6/2005 | Mattes et al. | 340/436 |
| 2006/0087417 A1 * | 4/2006 | Kiribayashi | 340/435 |
| 2007/0200375 A1 * | 8/2007 | Ito et al. | 293/102 |
| 2007/0227797 A1 | 10/2007 | Takahashi et al. | |

FOREIGN PATENT DOCUMENTS

| | | |
|---|---|---|
| JP | 09-58379 | 3/1997 |
| JP | 11-310095 | 11/1999 |
| JP | 2000-264142 | 9/2000 |
| JP | 2006-44504 | 2/2006 |
| JP | 2006-117157 | 5/2006 |
| JP | 2007-290682 | 11/2007 |
| WO | WO 2005110819 A1 * | 11/2005 |

OTHER PUBLICATIONS

Office action dated May 19, 2009 in Japanese Application No. 2007-190676.

* cited by examiner

*Primary Examiner* — George Bugg
*Assistant Examiner* — Naomi Small
(74) *Attorney, Agent, or Firm* — Harness, Dickey & Pierce, PLC

(57) ABSTRACT

A collision detector includes a chamber, a pressure sensor, and a bumper absorber. The chamber defines a hollow space, and the pressure sensor detects a pressure in the hollow space. The bumper absorber absorbs impact caused by a collision of an object with a vehicle, and covers an outer periphery of the chamber. The chamber and the bumper absorber are interposed with a gap in an entire width of the vehicle. In case of collision, the chamber is not bound by the bumper absorber deformed by the impact of the collision, thereby enabling an accurate detection of the collision of the vehicle with the object.

26 Claims, 4 Drawing Sheets

FRONT ← → REAR

FRONT ←→ REAR

FRONT ←→ REAR

FRONT ← → REAR

FRONT ← → REAR

COLLISION DETECTION APPARATUS AND METHOD FOR SAME

CROSS REFERENCE TO RELATED APPLICATION

The present application is based on and claims the benefit of priority of Japanese Patent Application No. 2007-190676 filed on Jul. 23, 2007, the disclosure of which is incorporated herein by reference.

FIELD OF THE INVENTION

The present disclosure generally relates to a collision detection apparatus capable of detecting a collision of a vehicle with a pedestrian or the like.

BACKGROUND INFORMATION

Conventionally, a collision of a walker, a pedestrian or the like with a vehicle is detected by a device that is disclosed, for example, in Japanese patent document JP-A-2006-117157 (Also published as US patent document 20060087417). This obstacle detection device for vehicular use in the above disclosure includes an absorber, a pressure sensor, a speed sensor, and an airbag ECU device. The absorber absorbs an impact of the collision that is caused by a collision of an object with the vehicle. The absorber includes a chamber member and a connection member. The chamber member is connected by using the connection member, and is fixed on a front face of a bumper reinforcement. The inside of the chamber member, that is, a chamber, is filled with air. The pressure sensor is a sensor for detecting a pressure in the chamber. The pressure sensor is connected to the connection member through a tube. The speed sensor for detecting a vehicle speed is disposed in a vehicle. The pressure sensor and the speed sensor are connected to the airbag ECU. The airbag ECU determines whether the colliding object that collides with the bumper of the vehicle is a walker based on a detection result of the pressure sensor and the speed sensor. More practically, whether the pressure inside the chamber exceeds a threshold that is determined based on the vehicle speed is used as a criterion for determination that the colliding object is a walker.

The chamber member and the absorber in the obstacle detection device are, in some cases, disposed as separate members for more securely absorbing the impact of the collision with the colliding object. For example, the absorber is disposed to cover the chamber member. In this case, the absorber is deformed as the vehicle collides with the object. In the course of collision, the chamber member may be bound by the deformed absorber. If the chamber member is bound by the absorber, the load for deformation may increase, and the deformation of the chamber member may be interfered. Therefore, the pressure in the chamber member may be prevented from being changed, thereby leading to an inaccurate detection of the collision of the vehicle with an object.

SUMMARY OF THE INVENTION

In view of the above and other problems, the present disclosure provides a collision detection apparatus that can accurately detect a collision of a vehicle with an object by preventing binding of a chamber member by a deformed bumper absorber.

The fact that a gap arranged between the chamber member and the bumper absorber has an effect for preventing the binding of the chamber member by the deformed bumper absorber is found based on a continued effort, experiments and endeavor of the inventor.

An aspect of the collision detection apparatus of the present invention includes: a chamber that defines a hollow space; a pressure sensor that is connected to the chamber and is capable of detecting a pressure in the hollow space; and a bumper absorber that covers the chamber and absorbs impact caused by a collision of an object with a vehicle. The collision detection apparatus detects the collision of the vehicle with the object based on a detection result of the pressure sensor, and the chamber and the bumper absorber are interposed with a predetermined amount of gap. The configuration of the collision detection apparatus has a gap arranged between the chamber member and the bumper absorber. Therefore, the chamber member will not be bound by the bumper absorber even when the bumper absorber is deformed due to the collision of the vehicle with the object. As a result, the increase of the lord for deformation is prevented, thereby preventing an interference of the deformation of the chamber member. The prevention of the interference of the deformation of the chamber member enables an accurate detection of the collision of the vehicle with the object.

BRIEF DESCRIPTION OF THE DRAWINGS

Other objects, features and advantages of the present invention will become more apparent from the following detailed description made with reference to the accompanying drawings, in which.

DETAILED DESCRIPTION

An embodiment of the present invention is described in the following for providing what the idea of the present invention is. In the present embodiment, an example which is an application of a collision detection device of the present invention to a walker collision detection apparatus to detect a walker who collides with a bumper of a vehicle is shown.

First Embodiment

Figure 1:
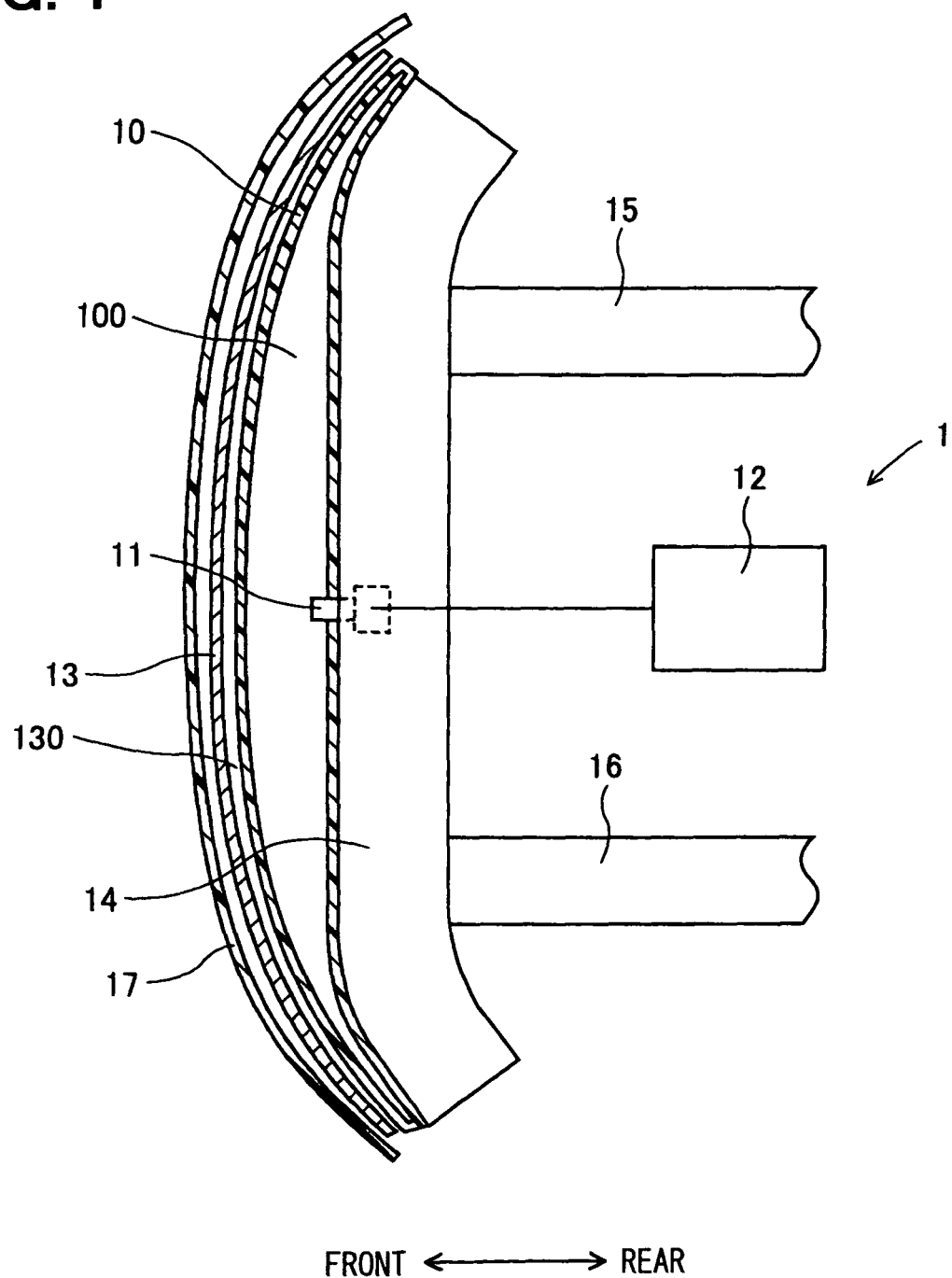
FIG. 1 shows a configuration of a walker collision detection apparatus in a first embodiment of the present invention.
Figure 2:
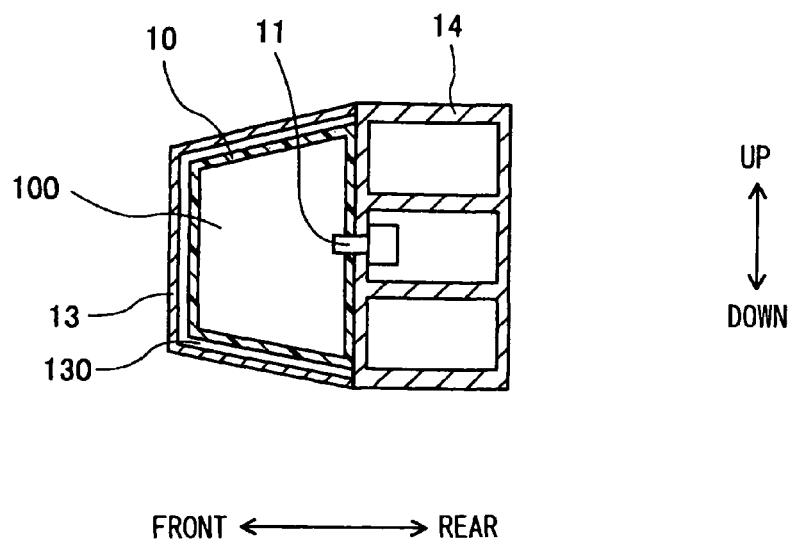
FIG. 2 shows a cross-sectional view of a bumper reinforcement, a chamber member and a bumper absorber in the first embodiment of the present invention.

First, the configuration of a walker collision detection apparatus is explained referring to FIG. 1 and FIG. 2. FIG. 1 is a configuration of the walker collision detection apparatus in the first embodiment of the present invention. FIG. 2 is a cross-sectional view of a bumper reinforcement, a chamber member and a bumper absorber. In addition, the front and rear direction and the up and down direction in the drawing show the front and rear direction and the up and down direction of the vehicle.

As shown in FIG. 1 and FIG. 2, a walker collision detection apparatus 1 (a collision detector) consists of a chamber member 10, a pressure sensor 11, a walker collision determination unit 12, and a bumper absorber 13.

The chamber member 10 is a member made of resin or the like that defines a chamber 100 that forms a substantially sealed space. The chamber member 10 forms, for example, a long sack shape with a cross section having a square shape. In the chamber 100, air is sealed. The chamber member 10 is fixed on a front face of a bumper reinforcement 14 that extends in a vehicle width direction. In this case, the bumper reinforcement 14 is fixed on a front edge of a pair of side members 15, 16 that extend in a front and back direction of the vehicle to constitute a vehicle frame.

The pressure sensor 11 is connected to chamber member 10, and it is a sensor detecting pressure in the chamber 100. The pressure sensor 11 is accommodated in the inside of the bumper reinforcement 14, and it is connected to the chamber member 10 in a state that an end of the sensor 11 is projected forward.

The walker collision determination unit 12 determines, based on a detection result of the pressure sensor 11, whether a colliding object is a walker, and outputs a corresponding signal. That is, for example, the determination unit 12 is a device having a microcomputer or the like. The walker collision determination unit 12 is arranged in an inside of the vehicle, and it is connected to the pressure sensor 11.

The bumper absorber 13 is, for example, an elongated form member made of resin with a substantially U shaped cross section for absorbing an impact of collision of the vehicle with an object. The absorber 13 is disposed to cover the circumference of the chamber member 10, and the absorber 13 is fixed to the bumper reinforcement 14. More practically, the absorber 13 and the chamber member 10 are interposed with a gap 130 that extends in an entire area of the vehicle width direction. In other words, the gap 130 is arranged to be on a front face, on a top face, and on a bottom face of the chamber member 10. Further, in front of the bumper absorber 13, a bumper cover 17 made of, for example, resin is disposed. The bumper cover 17 has an elongated board form.

An operation of the walker collision detection apparatus 1 is explained referring to FIG. 1 and FIG. 2 in the following. When an electric power is supplied for the walker collision detection apparatus 1 in FIG. 1 and FIG. 2, the pressure sensor 11 and the walker collision determination unit 12 start the operation. When a walker collides with the bumper cover 17, the bumper cover 17 is deformed backward. The deformation of the cover 17 leads to the deformation of the bumper absorber 13 and the chamber member 10. However, the gap 130 is arranged between the absorber 13 and the chamber member 10. Therefore, the chamber member 10 will not be bound by the bumper absorber 13 even when the bumper absorber 13 is deformed. As a result, the deformation of the chamber member 10 will not be prevented due to the increase of the deformation pressure. The bumper absorber 13 absorbs the shock and the impact that are caused by a collision while being deformed. The pressure in the chamber 100 rises as the chamber 100 deforms. The pressure sensor 11 detects pressure in the chamber 100. The walker collision determination unit 12 determines, based on a detection result of the pressure sensor 11, whether the colliding object is a walker, and outputs a corresponding signal.

Advantageous effects of the present embodiment are explained next. According to the walker collision detection apparatus 1 of the first embodiment, the gap 130 is arranged between the chamber member 10 and the bumper absorber 13. Therefore, even if the bumper absorber 13 is deformed by the collision of the object with the vehicle, the chamber member 10 will not be bound by the deformed bumper absorber 13. As a result, the deformation of the chamber member 10 will not be prevented due to the increase of the deformation pressure. As the chamber member 10 is freely deformed, the pressure in the chamber 100 changes according to the impact of the collision of the object with the vehicle, thereby enabling an accurate detection of the collision of the walker with the vehicle. Further, a load on a leg portion of the walker is decreased.

In addition, according to the walker collision detection apparatus 1 of the first embodiment, the gap 130 is arranged in the upper part of chamber member 10 and the lower part of the chamber member 10. In the present embodiment, the binding by the deformed bumper absorber 13 occurs in the upper and lower part of the chamber member 10. Therefore, the binding by the deformed bumper absorber 13 is securely prevented by the arrangement of the gap 130 in the upper and lower part of the chamber member 10.

Further, according to the walker collision detection apparatus 1 of the first embodiment, the gap 130 is arranged for an entire vehicle width area. Therefore, the binding of the chamber member 10 by the deformed bumper absorber 13 is securely prevented regardless of a position of collision.

Furthermore, in the first embodiment, the bumper absorber 13 is made of metal. However, the absorber 13 may also be made of, for example, resin.

Furthermore, as mentioned above, the combination of the detection result from the pressure sensor 11 and other sensors such as a speed sensor may be used for detecting the collision by the walker collision determination unit 12 instead of determination of collision based only on the detection result of the pressure sensor 11 in the first embodiment.

Second Embodiment

The walker collision detection apparatus in the second embodiment is explained next. The walker collision detection apparatus of the second embodiment has a configuration change of the chamber member relative to the walker collision detection apparatus in the first embodiment.

Figure 3:
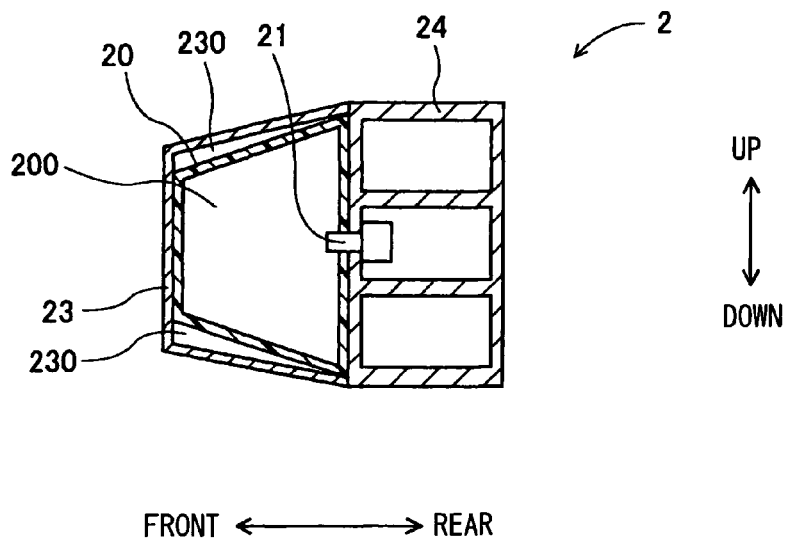
FIG. 3 shows a cross-sectional view of the bumper reinforcement, the chamber member and the bumper absorber in a second embodiment of the present invention.

First, FIG. 3 is referred to for the explanation of the configuration of the walker collision detection apparatus. FIG. 3 shows a cross-sectional view of the bumper reinforcement, the chamber member and the bumper absorber of the walker collision detection apparatus in the second embodiment. In addition, the front and rear directions, and the up and down directions respectively indicate the front and rear directions and the up and down directions of the vehicle body. The following description only describes the difference of the apparatus from the one in the first embodiment, that is, the difference of the configuration of the chamber member, and common parts with the first embodiment are described as required.

A walker collision detection apparatus 2 (a collision detector) has a chamber member 20, a pressure sensor 21, and a bumper absorber 23 as shown in FIG. 3.

For example, the chamber member 20 is in a long sack shape with its cross section substantially in a square shape.

The chamber member 20 is fixed on a front face of the bumper reinforcement 24 that extends in the vehicle width direction.

The bumper absorber 23 is in a long board shape with its cross section substantially in a U shape. The bumper absorber 23 is arranged to cover a circumference of the chamber member 20, and the bumper absorber 23 is fixed on the bumper reinforcement 24. The front face of the front-most portion of the chamber member 20 is abutted to a rear face of the front-most portion of the bumper absorber 23. The bumper absorber 23 is arranged to have a gap 230 only in the upper part and in the lower part of the chamber member 20 in all areas throughout the vehicle width direction.

Advantageous effects of the present embodiment are explained in the following. The configuration of the walker collision detection apparatus 2 in the second embodiment only differs from the walker collision detection apparatus 1 in a portion of the chamber member 20, thereby yielding the same effect as the apparatus 1 in the first embodiment.

Figure 4:
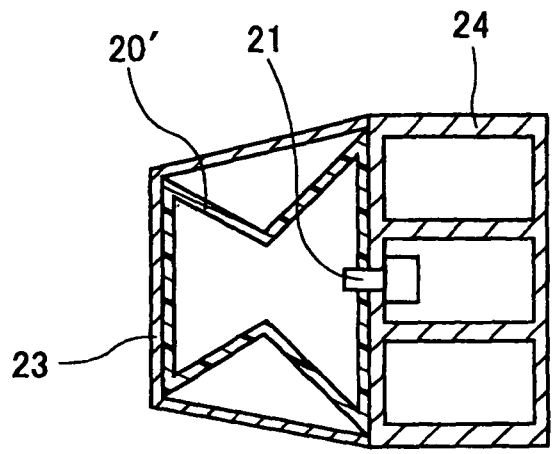
FIG. 4 shows a cross-sectional view of a modification of the bumper reinforcement, the chamber member and the bumper absorber in the second embodiment of the present invention.
Figure 5:
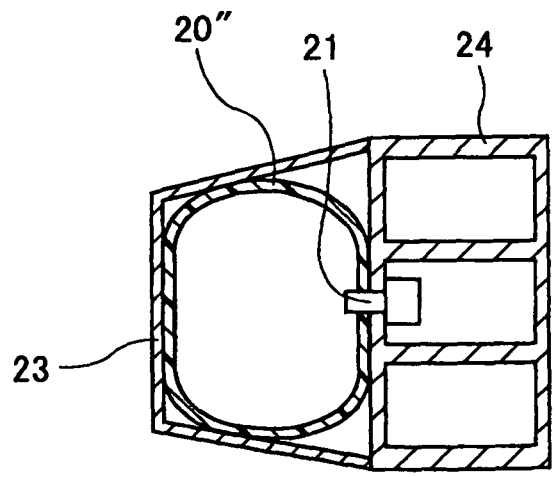
FIG. 5 shows a cross-sectional view of another modification of the bumper reinforcement, the chamber member and the bumper absorber in the second embodiment of the present invention.

In addition, the substantially square shaped cross section of the chamber member in the second embodiment may be modified, for example, in the following manner. That is, as shown in FIG. 4, the chamber member 20' may have a bent portion at both of the center of the top and bottom face in the front and rear direction. The bent at the center of the top face of the member 20' may be bent downward, and the bent at the center of the bottom face of the member 20' may be bent upward. Further, the chamber member 20" may have a substantially oval cross section as shown in FIG. 5.

Third Embodiment

The walker collision detection apparatus in the third embodiment is explained next. The walker collision detection apparatus of the third embodiment has a protrusion on a front face of the chamber member. The protrusion on the front face of the chamber member serves as a space with the bumper absorber for securely reserving a gap from the bumper absorber.

Figure 6:
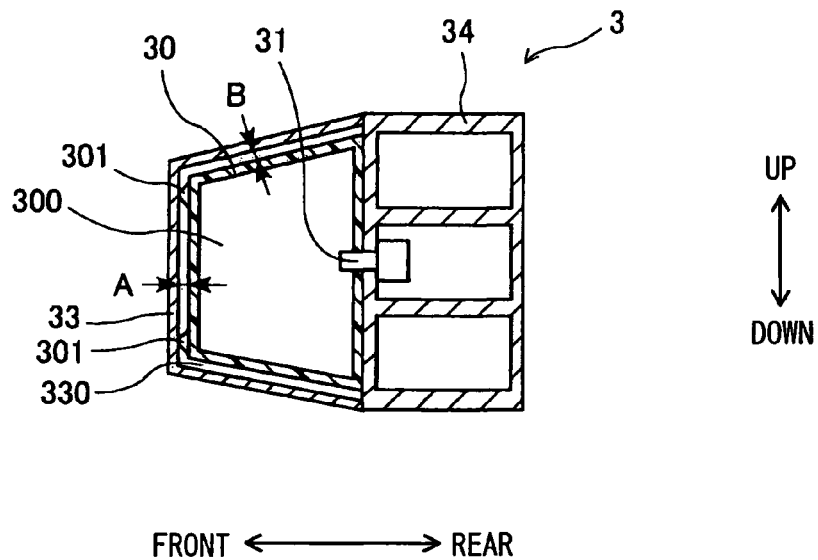
FIG. 6 shows a cross-sectional view of the bumper reinforcement, the chamber member and the bumper absorber in a third embodiment of the present invention.

First, FIG. 6 is referred to for the explanation of the configuration of the walker collision detection apparatus. FIG. 6 shows a cross-sectional view of the bumper reinforcement, the chamber member and the bumper absorber of the walker collision detection apparatus in the third embodiment. In addition, the front and rear directions, and the up and down directions respectively indicate the front and rear directions and the up and down directions of the vehicle body. The following description only describes the difference of the apparatus from the one in the first embodiment, that is, the configuration of the chamber member, and common parts with the first embodiment are described as required.

A walker collision detection apparatus 3 (a collision detector) has a chamber member 30, a pressure sensor 31, and a bumper absorber 33 as shown in FIG. 6.

A front face of the chamber member 30, more practically, an upper edge and a lower edge of the front face has a protrusion 301 that protrudes forward. On the front face of the chamber member 30, plural protrusions 301 are arranged in the vehicle width direction. The dimension of the protrusion 301 in the front and rear direction is set to 4 millimeters.

The bumper absorber 33 is fixed on the bumper reinforcement 34 in a condition that the absorber 33 covers the circumference of the chamber member 30 with a rear face of the front-most portion of the absorber 33 abutted to a pointed end of the protrusion 301. Because the protrusion 301 is abutted to the rear face of the front-most portion of the facing bumper absorber 33, the dimension A of a gap 330 on a front side of the chamber member 30 is set to 4 millimeters. Further, dimension B of a gap 330 on an upper side and a lower side of the chamber member 30 is set to 2 millimeters.

Advantageous effects of the present embodiment are explained in the following. According to the walker collision detection apparatus 3 of the third embodiment, the gap 330 on the front side of the chamber member 30 is set to 4 millimeters, and the gaps 330 on the upper side and the lower side of the chamber member 30 are respectively set to 2 millimeters. If the gap 330 is large, the detection accuracy of the pressure in a chamber 300 may deteriorate. Therefore, by having the gap 330 being within the dimension of 10 millimeters, the binding of the chamber member 30 by the bumper absorber 33 as well as the deterioration of the detection accuracy of the pressure in the chamber 300 are prevented.

In addition, by having the protrusion 301, the gap 330 is securely reserved. In this case, the size of the gap 330 is precisely controlled by adjusting the dimension of the protrusion 301.

The protrusion 301 disposed on the chamber member 30 in plural numbers in the vehicle width direction may be arranged in a different manner. That is, for example, the protrusion may be disposed on the bumper absorber. The protrusion may have a continuous form that extends in the vehicle width direction.

Fourth Embodiment

The walker collision detection apparatus in the fourth embodiment is explained next. The walker collision detection apparatus of the fourth embodiment has a difference from the apparatus in the first embodiment that a cushion member is interposed between the chamber member and the bumper absorber.

Figure 7:
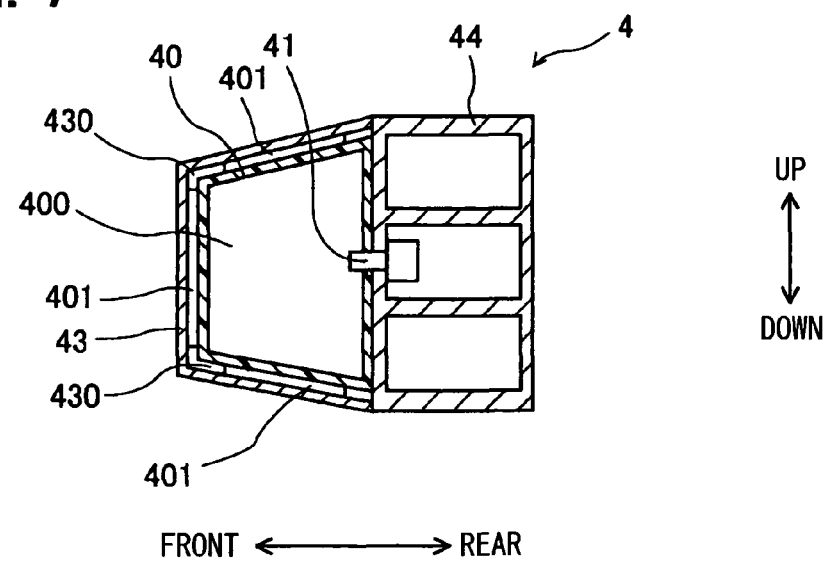
FIG. 7 shows a cross-sectional view of the bumper reinforcement, the chamber member and the bumper absorber in a fourth embodiment of the present invention.

First, FIG. 7 is referred to for the explanation of the configuration of the walker collision detection apparatus. FIG. 7 shows a cross-sectional view of the bumper reinforcement, the chamber member and the bumper absorber of the walker collision detection apparatus in the fourth embodiment. In addition, the front and rear directions, and the up and down directions respectively indicate the front and rear directions and the up and down directions of the vehicle body. The following description only describes the difference of the apparatus from the one in the first embodiment, that is, the cushion member in the configuration, and common parts with the first embodiment are described as required.

A walker collision detection apparatus 4 (a collision detector) has a chamber member 40, a pressure sensor 41, and a bumper absorber 43 as shown in FIG. 7.

On a front face, an upper face and a lower face of the chamber member 30, a board-shaped cushion member 401 is arranged. The cushion member 401 is arranged in plural numbers in the vehicle width direction. The cushion member 401 is set to have a smaller stiffness relative to the bumper absorber 43. In addition, the thickness of the cushion member 401 is set to 3 millimeters.

The bumper absorber 43 is fixed on the bumper reinforcement 44 in a condition that the absorber 43 covers the circumference of the chamber member 40 with an inner face abutted to the cushion member 401. Because the cushion member 401 is abutted to the inner face of bumper absorber 43, the dimension of a gap 430 is set to 3 millimeters.

Advantageous effects of the present embodiment are explained next. According to the walker collision detection apparatus 4 of the fourth embodiment, the gap 430 is set to 3 millimeters. Therefore, similarly to the walker collision detection apparatus 3 of the third embodiment, the binding of the chamber member 40 by the bumper absorber 43 as well as the deterioration of the detection accuracy of the pressure are prevented.

In addition, the gap 430 can be securely provided by the arrangement of the cushion member 401. Further, the size of the gap 430 can be precisely controlled by adjusting the thickness of the cushion member 401.

Further, even if the bumper absorber 43 binds the cushion member 401, the cushion member 401 does not affect the chamber member 40 due to the smaller stiffness of the cushion member 401 relative to the absorber 43.

The cushion member 401 disposed on the chamber member 40 in plural numbers in the vehicle width direction may be arranged in a different manner. That is, for example, the protrusion may have a continuous form that extends in the vehicle width direction.

Although the present invention has been fully described in connection with the preferred embodiment thereof with reference to the accompanying drawings, it is to be noted that various changes and modifications will become apparent to those skilled in the art.

For example, though the walker collision detection apparatus in the first to fourth embodiments are disposed in the front bumper of the vehicle, the walker collision detection apparatus may be disposed in a different manner. That is, the walker collision detection apparatus may be disposed on a rear bumper of the vehicle being arranged on a rear side of the vehicle. The walker collision detection apparatus arranged on the rear side of the vehicle is expected to have the same advantageous effect as the above embodiments.

Such changes and modifications are to be understood as being within the scope of the present invention as defined by the appended claims.

What is claimed is:

1. A collision detector comprising:
a chamber that defines a hollow space;
a pressure sensor that is connected to the chamber and is capable of detecting a pressure in the hollow space;
a bumper absorber that covers the chamber and absorbs impact caused by a collision of an object with a vehicle; and
a bumper cover that covers the bumper absorber and the chamber; wherein
a detection result of the pressure sensor is used to detect the collision of the object with the vehicle, and
the chamber and the bumper absorber are interposed with a predetermined amount of open gap.

2. The collision detector of claim 1, wherein
the predetermined amount open of gap is positioned at least one of a front face side, an upper side and a lower side of the chamber.

3. The collision detector of claim 1, wherein
the predetermined amount of open gap is equal to or smaller than 10 millimeters.

4. The collision detector of claim 1, wherein
the predetermined amount of open gap is formed by a protrusion on one of a chamber surface and a bumper absorber surface that is abutted to an opposing surface.

5. The collision detector of claim 1, wherein
the predetermined amount of open gap is formed by a cushion that is interposed between the chamber and the bumper absorber.

6. The collision detector of claim 1, wherein
the predetermined amount of open gap extends to an entire width of the vehicle.

7. The collision detector of claim 1, wherein
the detection result of the pressure sensor is used by a determination unit that determines whether a colliding object is a pedestrian.

8. The collision detector of claim 1, wherein
the predetermined amount of open gap is equal to or greater than 1 millimeter.

9. The collision detector of claim 1, wherein the chamber is not bound by the bumper absorber at a time of collision of the vehicle due to deformation of the bumper absorber.

10. The collision detector of claim 1, wherein the chamber is a sealed chamber.

11. The collision detector of claim 1, wherein the pressure sensor is disposed outside of the chamber.

12. A collision detector comprising:
a chamber member that defines a sealed hollow space;
a pressure sensor that is in communication with the chamber member detecting an increase of a pressure of gas disposed in the hollow space;
a bumper absorber that covers the chamber member and absorbs impact caused by a collision of an object with a vehicle; and
a bumper cover that covers the bumper absorber and the chamber; wherein
a detection result of the pressure sensor is used to detect the collision of the object with the vehicle, and
the chamber member and the bumper absorber are interposed with a predetermined amount of open gap greater than zero.

13. The collision detector of claim 12, wherein
the predetermined amount of open gap is positioned at least one of a front face side, an upper side and a lower side of the chamber member.

14. The collision detector of claim 12, wherein
the predetermined amount of open gap is equal to or smaller than 10 millimeters.

15. The collision detector of claim 12, wherein
the predetermined amount of open gap is formed by a protrusion on one of a chamber surface and a bumper absorber surface that is abutted to an opposing surface.

16. The collision detector of claim 12, wherein
the predetermined amount of open gap is formed by a cushion that is interposed between the chamber member and the bumper absorber.

17. The collision detector of claim 12, wherein
the predetermined amount of open gap extends to an entire width of the vehicle.

18. The collision detector of claim 12, wherein
the detection result of the pressure sensor is used by a determination unit that determines whether a colliding object is a pedestrian.

19. The collision detector of claim 12, wherein
the predetermined amount of open gap is equal to or greater than 1 millimeter.

20. The collision detector of claim 12, wherein the pressure sensor is disposed outside of the chamber.

21. The collision detector of claim 1, wherein the open gap prevents the bumper absorber from binding the chamber.

22. The collision detector of claim 1, wherein the chamber and bumper absorber are disposed substantially in parallel, and the open gap is interposed therebetween.

23. The collision detector of claim 12, wherein the open gap prevents the bumper absorber from binding the chamber.

24. The collision detector of claim 12, wherein the chamber and bumper absorber are disposed substantially in parallel, and the open gap is interposed therebetween.

25. The collision detector of claim 1, wherein the bumper absorber and the bumper cover are interposed with a predetermined amount of open space.

26. The collision detector of claim 12, wherein the bumper absorber and the bumper cover are interposed with a predetermined amount of open space.

* * * * *